Oct. 10, 1939.  H. ALLEN  2,175,372
INSIDE PIPE CUTTER
Filed Feb. 4, 1937  4 Sheets-Sheet 1
FIG_1.  FIG_2.
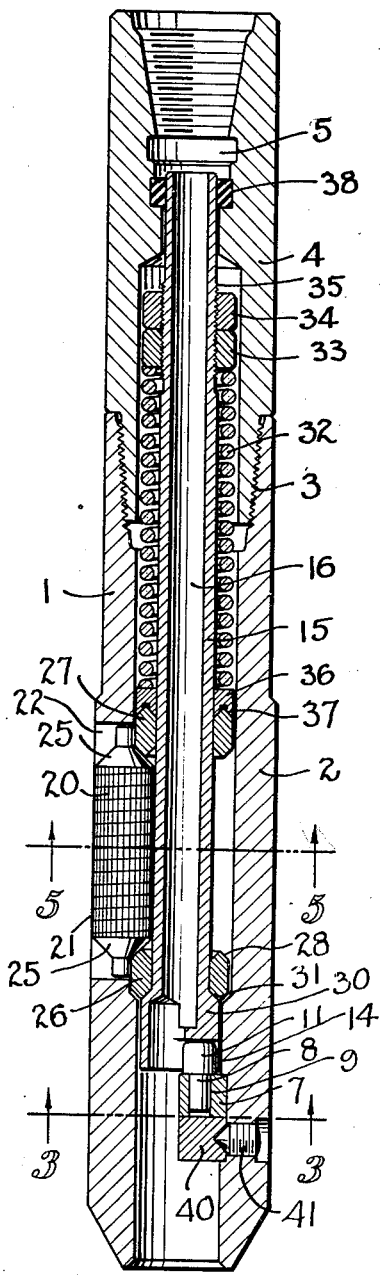
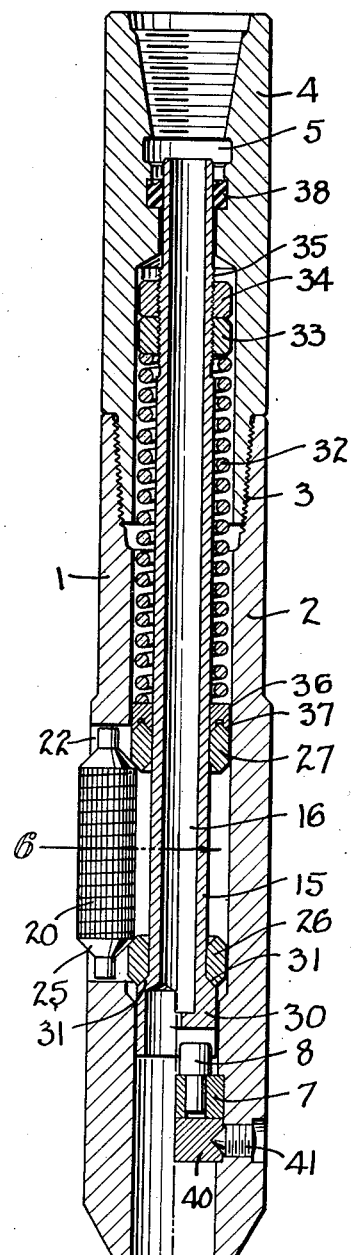
HERBERT ALLEN.
INVENTOR.
Jesse R Stone
Lester B Clark
BY
ATTORNEYS.

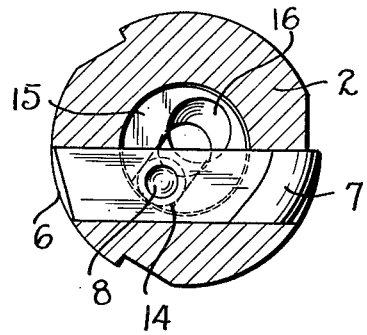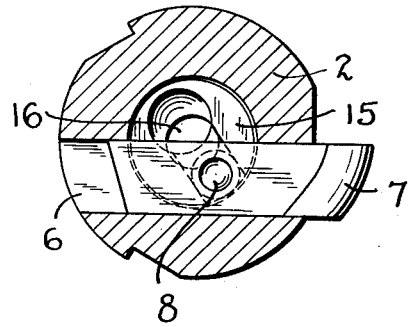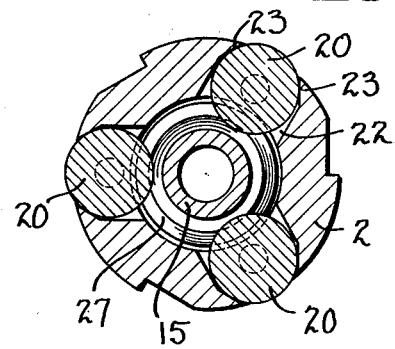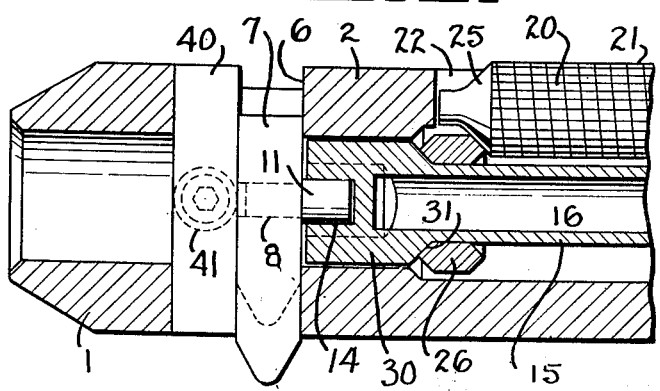

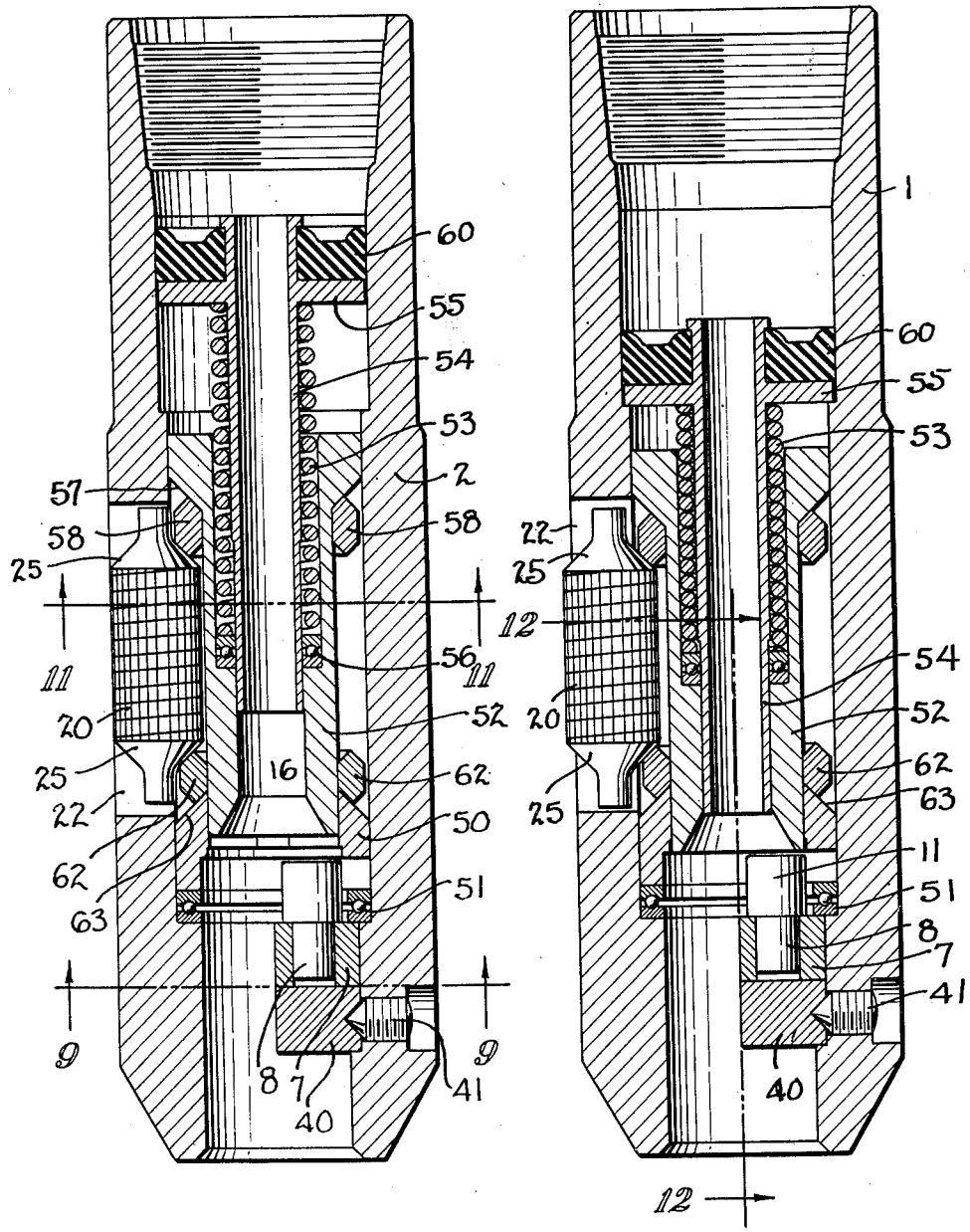

Oct. 10, 1939.   H. ALLEN   2,175,372
INSIDE PIPE CUTTER
Filed Feb. 4, 1937   4 Sheets-Sheet 4
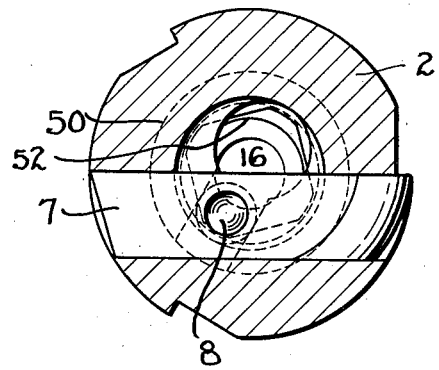
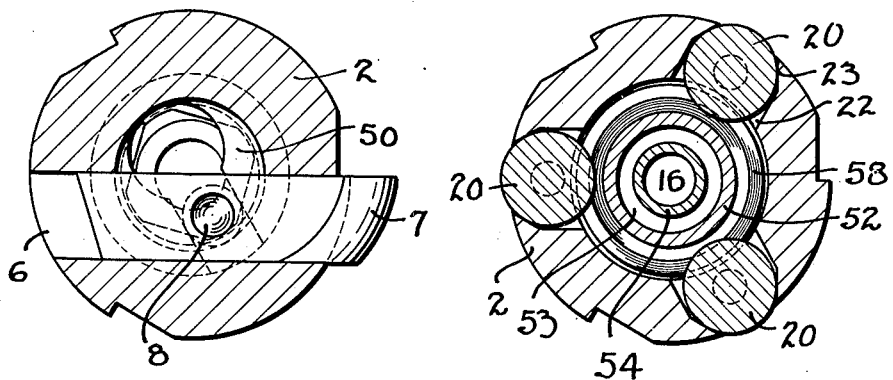
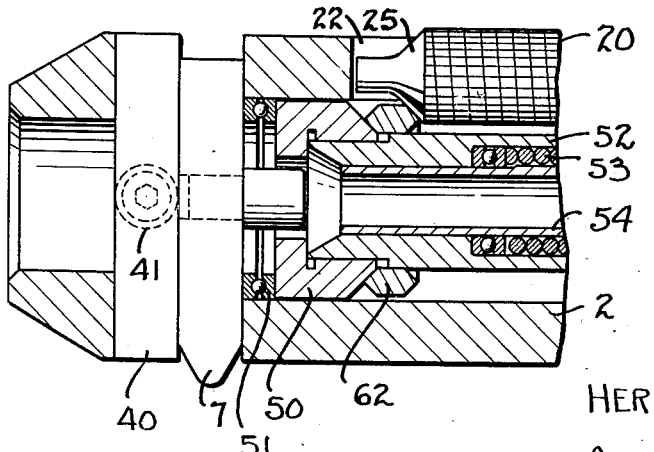
HERBERT ALLEN.
INVENTOR.
Jesse R. Stone
Lester B. Clark.
BY
ATTORNEYS.

Patented Oct. 10, 1939

2,175,372

UNITED STATES PATENT OFFICE 2,175,372

INSIDE PIPE CUTTER

Herbert Allen, Houston, Tex., assignor to James S. Abercrombie, Houston, Tex.

Application February 4, 1937, Serial No. 123,971

10 Claims. (Cl. 164—0.4)

The invention relates to an inside pipe cutter and particularly of the type where the advancement of the cutter blades to effect the cutting operation is due to a friction drive so that a yielding pressure is applied to the cutters.

In the cutting of pipe in wells it is difficult to obtain proper centering of the cutting tool with respect to the pipe being cut and to provide a tool which will permit the cutters to absorb the shocks of engagement with the pipe and to also absorb the shock of the cutter gouging into the pipe. To overcome these objections and provide a tool which will force the cutter with a yieldable pressure which is sufficient to negotiate the cutting action the present tool has been devised with a friction drive.

It is one of the objects of the invention to provide a positive yet yieldable drive for an inside pipe cutter.

Another object of the invention is to provide an inside pipe cutter where the advancement of the cutters is effected by a driving connection to the pipe being cut.

Another object of the invention is to provide a yieldable pressure for a cutter drive construction in an inside pipe cutter.

Another object of the invention is to provide a loaded friction drive for pipe cutters.

Another object of the invention is to provide a fluid pressure operated friction drive for pipe cutters.

Another object of the invention is to provide a friction roller contact with the pipe being cut in order to impart a driving action to the cutter member.

Other and further objects of the invention will be readily apparent when the following description is considered in connection with the accompanying drawings wherein:

Fig. 1 is a vertical sectional view of an inside pipe cutter constructed in accordance with the invention and showing the friction drive rollers in retracted position.

Fig. 2 is a sectional view similar to Fig. 1 but showing the drive rollers in operating position.

Fig. 3 is a section taken on the line 3—3 of Fig. 1 and showing the cutter in retracted position.

Fig. 4 is a similar section but showing the cutter in extended position.

Fig. 5 is a section taken on the line 5—5 of Fig. 1.

Fig. 6 is a broken sectional view taken on the line 6—6 of Fig. 2.

Fig. 7 is a vertical sectional view of a modified form of the invention wherein the fluid pressure is used to load the friction drive.

Fig. 8 is a vertical section like Fig. 7 but showing the parts in operating position.

Fig. 9 is a section taken on the line 9—9 of Fig. 7 and showing the cutter in retracted position.

Fig. 10 is a section similar to Fig. 9 but showing the cutter in extended position.

Fig. 11 is a vertical section taken on the line 11—11 of Fig. 7.

Fig. 12 is a broken sectional view taken on the line 12—12 of Fig. 8.

The cutter is made up of a housing 1 which is composed of the lower portion 2 which is threaded at 3 in order to receive the upper subportion 4. These two portions are provided with a passage 5 therethrough and the various parts of the cutter are assembled within this passage. The lower portion 2 is seen in section in Fig. 3 as having a transverse recess 6 therein to receive the cutter blade 7. This blade moves laterally in the housing in order to move from retracted to operative position. Fig. 3 shows it retracted. In order to manipulate the cutter blade 7 a pin 8 extends into the recess 9 in the cutter. The pin has a head 11 thereon which extends above the horizontal top of the cutter and is received in the eccentric opening 14 in the lower end of the stem 15. In view of the eccentric arrangement of this pin 8 it seems obvious that as the pin is rotated about the axis of the cutter, as seen in Fig. 3, the pin 8 will cause transverse movement of the cutter 7 so that it can be extended or retracted with a positive pressure.

The stem 15 extends through the portions 2 and 4 and has an opening 16 therethrough for the passage of fluid so that circulation can be maintained downwardly through the tool if desired.

In order to impart rotation to the stem 15 in order to operate the cutter a set of friction rollers 20 have been provided. Fig. 5 shows three such rollers equally spaced about the axis of the tool. Each of these rollers is provided with a knurled surface 21 so that it will engage with the inner surface of the pipe being cut, and as the housing rotates each of the rollers will be compelled to rotate in turn about its own axis due to the frictional engagement of the knurled surface 21 with the inside of the pipe. Each of these rollers is housed in a recess 22 which has inwardly extending lips 23 on each side of the roller so as to confine the roller and prevent its outward movement.

Each end of the roller is provided with a frusto-conical surface 25 which serves as the driving surface to impart rotation to the drive rings 26 and 27 which are arranged to engage the bottom and the top of the rollers, respectively. These driven rings are provided with tapered faces at 28 so that they will cooperate with the conical faces 25 on the rollers.

As seen in Fig. 1, the rollers are in retracted position, whereas Fig. 2 shows the rollers in extended position. The extreme ends of the rollers are reduced beyond the surface 25 and terminate in small spindles as seen in the drawings. These spindles are disposed in the ends of the recesses 22 which may be narrowed so that the spindles tend to guide the rollers and hold them in aligned position in the recess. It is obvious that the rings 26 and 27 will move axially of the stem when there is a lateral movement of the roller 20. The lower portion of stem 15 is formed with an enlargement 30 in order to provide the tapered shoulder 31 upon which the ring 26 will be seated. In order to urge this ring 26 against the tapered surface 25 on the rollers a coil spring 32 is disposed about the stem and is confined at its upper end by a retaining ring 33 which is in turn held in position by a lock ring 34. These rings are adjustable along the threads 35 on the stem so as to vary the position of the upper end of the spring 32.

The lower end of the spring 32 abuts against a spacer 36 which is tapered on its lower face at 37 to receive the tapered edge of the upper driven ring 27. It will be seen that the spring 32 thus acts at one end against the ring 27 and the other end of the spring draws the ring 26 against the opposite ends of the rollers by applying its pressure between the nut 33 and the stem 15. The rings 26 and 27 are therefore normally urged toward each other and tend to throw the roller outwardly, as seen in Fig. 2. In this manner a yielding pressure is applied to the rollers to enforce them against the inside surface of the pipe being cut so that the rollers will spin on their own axis as the housing 2 is rotated. It seems clear that the adjustment of the nut 33 will vary the pressure which is used to load these rollers. The upper end of the stem 15 may be disposed in a suitable packing 38 to prevent accumulation of sand and grit about the parts.

It seems clear that as the rollers 20 rotate they will in turn impart rotation to the rings 26 and 27. These rings may be either rotatably or non-rotatably mounted upon the stem 15 so as to impart either a positive or a yieldable rotation thereto. If they are rotatably mounted then there may be a relative sliding action between the tapered faces on the ring 26 and face 31 on the stem at the bottom and between the top of the roller 37 and spacer 36. The frictional engagement thus provided would tend to rotate the stem 15. On the other hand these rings might be splined on the stem and all of the frictional engagement or relative slipping would then occur between the tapered faces on the rings 26 and 27 and the tapered faces 25 on the rollers.

In both cases there is a yielding action which tends to rotate the stem 15 and in this manner rotate the eccentric pin 8 so as to move the cutter 7 from the position shown in Fig. 3 to the position shown in Fig. 4. Tools of this type are generally constructed for right-hand rotation to cause the cutting operation so that it seems clear that if the direction of rotation were reversed and a slight left-hand rotation negotiated the friction of the rollers 20 would reverse the stem 15 and retract the cutter. In this manner the tool would be in position to be withdrawn from the well.

The cutter 7 is supported upon a retainer block 40 which is best seen in Fig. 6 as being the transverse member which extends through the body of the cutter and is held in position by a set screw 41. In order to facilitate removal of the cutter without disassembling the entire tool the set screw 41 may be removed and the block 40 can then be slipped laterally out of the housing. This provides sufficient space to allow the cutter 7 to move downwardly in the body or to the left, as seen in Fig. 6, so that it is released from the pin 8 and it too could be moved rearwardly out of the housing. The pin 8 may or may not move with the cutter. If it remains in the cutter then of course the head 11 would move out of its recess 14 when the cutter was moved. This is of advantage because new cutter blades can be inserted with very little effort and in many instances the cutters become worn.

The structure just described provides an arrangement wherein yielding pressure is applied to the cutter in order to advance or retract it and this pressure is created due to the rotation of the tool because of the drive rollers and the frictional loading of the driven rings by the spring 32.

Figs. 7 to 12 show a modified form of the invention which is the same as that previously described, except that the stem 15 has been modified somewhat to permit the application of fluid pressure to the device in order to load the frictional drive. As seen in Fig. 7, a base 50 is rotatably mounted upon a bearing 51 in the lower portion 2 of the housing. This base 50 corresponds to the lower end 30 of the stem 15 in Fig. 1, but it is made as a separate part from the main body of the stem 52, which is slidably mounted with respect thereto. The portion 52 is recessed to receive the spring 53 and the sleeve 54 of the head 55. The spring 53 exerts a thrust upon the bearing 56, which is seated in the body 52. The upper portion of the body 52 is formed with a tapered shoulder 57 against which the drive ring 58 is arranged to abut. In this manner any pressure on the spring 53 tends to drive the body 52 and the drive ring 58 downwardly so that this ring engages the tapered shoulder 57 on the drive roller 20. In order to load the spring 53 a piston head 55 has been provided and a suitable packing 60 forms a seal with the inside of the body 2. The operator, by varying the fluid pressure applied to the packing 60, can vary the load on the spring 53 and of course the friction with which the ring 58 bears against the roller 20. It will be seen that the recess 22 is of greater length than the roller 20 so that downward movement of the body 52 and ring 58 will force the lower tapered face 25 of the roller against the lower driven ring 62.

The lower driven ring in turn bears against the tapered surface 63 on the base 50 so as to impart rotation thereto. In this manner all of the pressure is applied to the one drive ring 62 and this pressure in turn rotates the eccentric pin 8 and operates the cutter 7, the same as previously described.

The form of the invention shown in Figs. 7 to 12 is of particular advantage in the larger diameter tools where the rollers 20 will only be forced out when there is a fluid pressure applied to the piston head 55 and also for tools which are to be used in the deeper wells where the tool must be lowered through a considerable length of pipe before it is to be operated, because with the Fig. 1 form of the invention the rollers 20 are urged outwardly at all times by the spring 32 and must be forced through the pipe which is to be cut.

Figs. 9 to 12 show sectional views of the modified form the same as the Figs. 3 to 6 in the spring loaded form.

Broadly, the invention contemplates a loaded friction drive for pipe cutters.

What is claimed is:

1. An inside pipe cutter comprising a housing, a cutter blade disposed therein for lateral movement, a stem, means eccentrically disposed on said stem to engage said cutter, driving means for said stem including members rotatable in proportion to the rotation of said housing, said last means including a friction drive against said stem.

2. An inside pipe cutter comprising a housing, a cutter blade disposed therein for lateral movement, a stem, means eccentrically disposed on said stem to engage said cutter, driving means for said stem including members rotatable in proportion to the rotation of said housing and a loaded friction drive member.

3. An inside pipe cutter including a housing, a stem therein, a friction ring thereon, contact members extensible from said housing to engage the pipe being cut so as to impart movement to said ring and stem, and cutter means to be advanced by movement of said stem.

4. An inside pipe cutter including a housing, a stem therein, a friction ring thereon, contact members extensible from said housing to engage the pipe being cut so as to impart movement to said ring and stem, cutter means to be advanced by movement of said stem, and a spring loaded mechanism for said friction ring.

5. An inside pipe cutter including a housing, a stem therein, a friction ring thereon, contact members extensible from said housing to engage the pipe being cut so as to impart movement to said ring and stem, cutter means to be advanced by movement of said stem, and by hydraulic operated mechanism to load said friction ring.

6. A pipe cutter of the character described including a housing, a plurality of rollers axially disposed about said housing for radial movement, a tapered shoulder on each of said rollers, a friction ring abutting said shoulders, a stem, means on said stem to urge said ring against said rollers to extend said rollers radially beyond the housing to engage the inside of the pipe being cut so as to effect spinning of said rollers and consequent driving of said ring and stem, and cutter means including an eccentric connection to said stem so as to extend said cutter means upon rotational movement of said stem.

7. A pipe cutter of the character described including a housing, a plurality of rollers axially disposed about said housing for radial movement, a tapered shoulder on each of said rollers, a friction ring abutting said shoulders, a stem, means on said stem to urge said ring against said rollers to extend said rollers radially beyond the housing to engage the inside of the pipe being cut so as to effect spinning of said rollers and consequent driving of said ring and stem, and cutter means including an eccentric connection to said stem so as to extend said cutter means upon rotational movement of said stem, said first means including an adjustable spring.

8. A pipe cutter of the character described including a housing, a plurality of rollers axially disposed about said housing for radial movement, a tapered shoulder on each of said rollers, a friction ring abutting said shoulders, a stem, means on said stem to urge said ring against said rollers to extend said rollers radially beyond the housing to engage the inside of the pipe being cut so as to effect spinning of said rollers and consequent driving of said ring and stem, and cutter means including an eccentric connection to said stem so as to extend said cutter means upon rotational movement of said stem, said first means including an adjustable spring, said first means including a plunger operable by hydraulic pressure.

9. In a pipe cutting tool of the character described having a stem operable to actuate the cutter member, a friction member on said stem, a drive member contacting said friction member, said drive member comprising a roller movable radially to protrude from the cutter to engage the inside of the pipe being cut, and means on said stem to urge said friction member against said roller.

10. A friction drive assembly for inside pipe cutters including a set of drive members to contact the pipe being cut and to roll around on the inside surface of said pipe as the pipe cutter is rotated, friction members contacting the opposite ends of said drive members, means to urge said friction members toward each other to engage said drive members and force them against the inside of the pipe, and a cutter blade to be urged against the pipe by the tendency of said means to rotate due to the drive of said members against the pipe.

HERBERT ALLEN.